United States Patent
Kuenzner

(10) Patent No.: US 11,814,061 B2
(45) Date of Patent: Nov. 14, 2023

(54) DRIVING SYSTEM WITH DIFFERENT DRIVING FUNCTIONS FOR AN AUTOMATED DRIVE AND A COMMON INPUT COMPONENT, AND METHOD FOR ACTIVATING A DRIVING FUNCTION VIA THE COMMON INPUT COMPONENT

(71) Applicant: Bayerische Motoren Werke Aktiengesellschaft, Munich (DE)

(72) Inventor: Hermann Kuenzner, Freising (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 470 days.

(21) Appl. No.: 16/668,189

(22) Filed: Oct. 30, 2019

(65) Prior Publication Data
US 2020/0062278 A1    Feb. 27, 2020

Related U.S. Application Data

(63) Continuation of application No. PCT/EP2018/060623, filed on Apr. 25, 2018.

(30) Foreign Application Priority Data

May 19, 2017    (DE) ...................... 10 2017 208 506.1

(51) Int. Cl.
*B60W 50/14*    (2020.01)
*B60W 30/18*    (2012.01)
(Continued)

(52) U.S. Cl.
CPC ............ *B60W 50/14* (2013.01); *B60W 30/18* (2013.01); *G05D 1/0088* (2013.01);
(Continued)

(58) Field of Classification Search
CPC ............ B60K 2370/00; B60K 2370/16; B60K 2370/175; B60K 2370/70; B60K 2370/77;
(Continued)

(56) References Cited

U.S. PATENT DOCUMENTS

| | | |
|---|---|---|
| 2014/0058588 A1 | 2/2014 | Vitet et al. |
| 2015/0006028 A1* | 1/2015 | Strauss ............. B60W 60/0051 701/36 |

(Continued)

FOREIGN PATENT DOCUMENTS

| | | |
|---|---|---|
| DE | 103 34 587 A1 | 2/2005 |
| DE | 10 2007 052 258 A1 | 6/2008 |

(Continued)

OTHER PUBLICATIONS

"Rechtsfolgen Zunehmender Fahrzeugautomatisierung" bast, 2012, www.bast.de/DE/Publikationen/Foko/Downloads/2012-11.pdf?_blob=publicationFile&v=1 with Abstract (two (2) pages).

(Continued)

*Primary Examiner* — Charles J Han
(74) *Attorney, Agent, or Firm* — Crowell & Moring LLP

(57) ABSTRACT

A driving system is provided with a plurality of different driving functions for an automated drive with different degrees of automation for a motor vehicle. At least the driving function with the highest degree of automation is not constantly available. The driving system has a user interface for interacting with the driver. The user interface has an input component which is common to the plurality of driving functions for a signaling, by the driver, of a driver-side request for an automated drive to the driving system. The driving system is designed to determine an operating action via the input component for an automated drive. After the operating action is determined, the available driving function of the plurality of driving functions which has the (Continued)

degree of automation with the highest potential is determined. Provided the driving function is determined which has the degree of automation with the highest potential among the available driving functions, the driving function can be activated.

18 Claims, 3 Drawing Sheets

(51) Int. Cl.
*G05D 1/00* (2006.01)
*B60W 50/00* (2006.01)

(52) U.S. Cl.
CPC . *B60W 2050/007* (2013.01); *B60W 2050/146* (2013.01); *G05D 2201/0213* (2013.01)

(58) Field of Classification Search
CPC .... B60K 2370/782; B60W 2050/0062; B60W 2050/007; B60W 2050/146; B60W 2540/00; B60W 2540/215; B60W 30/00; B60W 30/18; B60W 50/00; B60W 50/08; B60W 50/082; B60W 50/14; G05D 1/00; G05D 1/0088; G05D 2201/00; G05D 2201/02
See application file for complete search history.

(56) References Cited

U.S. PATENT DOCUMENTS

| | | | |
|---|---|---|---|
| 2015/0283998 A1 | 10/2015 | Lind et al. | |
| 2016/0231855 A1 | 8/2016 | Bendewald et al. | |
| 2018/0017969 A1* | 1/2018 | Nagy | B60W 30/182 |

FOREIGN PATENT DOCUMENTS

| | | |
|---|---|---|
| DE | 10 2007 029 594 A1 | 1/2009 |
| DE | 10 2009 033 752 A1 | 1/2011 |
| DE | 10 2010 046 917 A1 | 3/2012 |
| DE | 10 2010 046 918 A1 | 3/2012 |
| DE | 10 2010 063 792 A1 | 6/2012 |
| DE | 10 2011 105 435 A1 | 12/2012 |
| DE | 10 2012 101 686 A1 | 9/2013 |
| DE | 10 2012 016 774 A1 | 2/2014 |
| DE | 10 2013 110 864 A1 | 4/2015 |
| DE | 10 2014 014 118 A1 | 3/2016 |
| WO | WO 2016/109765 A1 | 7/2016 |

OTHER PUBLICATIONS

"(R) Taxonomy and Definitions for Terms Related to Driving Automation Systems for On-Road Motor Vehicles", Surface Vehicle Recommended Practice, SAE International, J3016, Sep. 2016, pp. 1-30 (30 pages).
International Search Report (PCT/ISA/210) issued in PCT Application No. PCT/EP2018/060623 dated Jul. 18, 2018 with English translation (five (5) pages).
German-language Written Opinion (PCT/ISA/237) issued in PCT Application No. PCT/EP2018/060623 dated Jul. 18, 2018 (six (6) pages).
German-language Search Report issued in counterpart German Application No. 10 2017 208 506.1 dated Apr. 29, 2018 with partial English translation (10 pages).

* cited by examiner

DRIVING SYSTEM WITH DIFFERENT DRIVING FUNCTIONS FOR AN AUTOMATED DRIVE AND A COMMON INPUT COMPONENT, AND METHOD FOR ACTIVATING A DRIVING FUNCTION VIA THE COMMON INPUT COMPONENT

CROSS REFERENCE TO RELATED APPLICATIONS

This application is a continuation of PCT International Application No. PCT/EP2018/060623, filed Apr. 25, 2018, which claims priority under 35 U.S.C. § 119 from German Patent Application No. 10 2017 208 506.1, filed May 19, 2017, the entire disclosures of which are herein expressly incorporated by reference.

BACKGROUND AND SUMMARY OF THE INVENTION

The invention relates to a driving system having a plurality of different driving functions with a different degree of automation for a motor vehicle and to the user interface which belongs to the driving system and is intended to activate the driving function. The invention also relates to a method for activating a driving function for automated driving from the plurality of different driving functions.

Within the scope of the document, the term "automated driving" can be understood as meaning driving with automated longitudinal or lateral guidance or autonomous driving with automated longitudinal and lateral guidance. Within the scope of this application, automated driving is typically driving for a relatively long time with a certain duration, for example on the freeway. The term "automated driving" comprises automated driving with any desired degree of automation. Exemplary degrees of automation are assisted, partially automated, highly automated or fully automated driving. These degrees of automation correspond, for example, to the definition by the BASt (Bundesanstalt für Straßenwesen—Federal Highway Research Institute) (see BASt publication "Forschung kompakt", November 2012 edition). During assisted driving, the driver carries out the longitudinal or lateral guidance, while the system performs the respective other function within certain limits. During partially automated driving (TAF), the system performs the longitudinal and lateral guidance for a certain period, in which case the driver must permanently monitor the system, like during assisted driving. During highly automated driving (HAF), the system performs the longitudinal and lateral guidance for a certain period (for example when driving on the freeway) without the driver having to permanently monitor the system; however, the driver must be able to assume the vehicle guidance in a certain time. During fully automated driving (VAF), the system can automatically manage driving in all situations for a specific application; a driver is no longer required for this application. The four degrees of automation mentioned above correspond to SAE levels 1 to 4 of the standard SAE J3016 (SAE—Society of Automotive Engineering). For example, highly automated driving (HAF) corresponds to level 3 of the standard SAE J3016. SAE level 5 is also provided in SAE J3016 as the highest degree of automation, but is not included in the definition by the BASt. SAE level 5 corresponds to driverless driving, in which the system can automatically manage all situations like a human driver during the entire journey; a driver is generally no longer required.

Driving systems are known which support a plurality of different driving functions for automated driving with a different degree of automation, for example a driving function for highly automated driving with longitudinal and lateral guidance, a driving function for partially automated driving with longitudinal and lateral guidance and one or more driving functions for assisted driving with automated longitudinal guidance (for example a cruise control function, in particular adaptive cruise control which is also referred to as ACC) or with automated lateral guidance (for example a lane guidance function with automatic lane guidance without steering by the driver).

In order to activate a driving function for automated driving, it is generally conventional to actuate an operating element, for example a pushbutton. If a plurality of driving functions for automated driving with a different degree of automation are provided, a plurality of operating elements can be used to activate the respectively desired driving function (and possibly also to deactivate this driving function). This is described, for example, in the document US 2015/0283998 A1.

Operating concepts in which the degree of automation of the automated driving can be centrally set by means of one or two operating elements are known.

For example, the document DE 10 2011 105 435 A1 describes an operating apparatus in which the degree of automation can be increased using a first pushbutton and can be reduced using a second pushbutton. The desired speed or the desired distance to a vehicle driving in front can be set during adaptive cruise control by means of a separate four-way rocker. The document DE 10 2010 046 918 A1 describes an operating device, wherein the degree of automation can be set using two buttons or alternatively using a slide controller. The document DE 10 2010 046 917 A1 also describes the practice of setting the degree of automation of the driver assistance system using two buttons. The document DE 10 2012 016 774 A1 describes an input apparatus for a motor vehicle, in which the degree of assistance from driver assistance systems can be set between "deactivated", "warning" and "intervention" using a slide controller. The document DE 103 34 587 A1 also describes a slide controller, in the case of which the driver assistance can be set between the extreme values of "full assistance" and "own responsibility". Reference is also made to the document DE 10 2010 063 792 A1 in which the intensity of the driver assistance is set by means of a slide controller, wherein one or more driver assistance functions are activated with an increase in the intensity and one or more driver assistance functions are deactivated with a decrease in the intensity.

Other input modalities such as voice or gestures are also contemplated.

In response to the actuation of the respective operating element, an attempt is made to activate the desired driving function. If the driving function is not available, feedback relating to its unavailability is generally provided (for example "automated driving currently not available"). Furthermore, the practice of signaling the availability of a driving function for automated driving to the driver even without actuating the operating element, for example in the combination instrument, in the head-up display (HUD) or on the operating element for activating the driving function itself, is known, for example, from US 2015/0283998 A1, DE 10 2013 110 864 A1 or DE 10 2007 029 594 A1.

A driving function for automated driving (for example a freeway pilot for highly automated driving on a freeway) is often a vehicle function which is not always available. This applies, in particular, to a driving function for highly automated driving or for partially automated driving. The availability of a driving function for automated driving may depend, for example, on the vehicle speed, the road type, the traffic density, the detection of lane markings (in the case of automated lateral guidance) or, in the case of a driving function for highly automated or fully automated driving, the presence of a sufficiently fast communication connection to a backend server or the approval of a route section for highly automated or fully automated driving. The availability of the respective driving function cannot be readily predicted by the user.

As a driver, it is necessary to know the time at which a driving function is available in order to then activate this driving function using the associated operating element. In the case of a plurality of different driving functions with a different degree of automation, in addition to monitoring the availability of the individual functions, the driver must also decide what driving function is desired in the current driving situation. It is not always easy for the driver to assign the operating element which is correct in the respective driving function to the respective driving situation. In addition to the burden caused by the driving process, it is also necessary to think about the activation of the driving function which is suitable in the respective driving situation.

The object of the invention is to provide a driving system having a plurality of driving functions with a different degree of automation, which system unburdens the driver when selecting and activating the driving function which is suitable in the driving situation. The object of the invention is also to provide a corresponding method for activating a driving function in a driving system having a plurality of driving functions with a different degree of automation.

The object is achieved by means of the features of the independent patent claims. Advantageous embodiments are described in the dependent claims. It is pointed out that additional features of a patent claim dependent on an independent patent claim can form, without the features of the independent patent claim or only in combination with a subset of the features of the independent patent claim, a separate invention which is independent of the combination of all features of the independent patent claim and can be made the subject matter of an independent claim in a divisional application or a subsequent application. This applies in the same manner to technical teachings described in the description that are able to form an invention independent of the features of the independent patent claims.

A first aspect of the invention relates to a driving system having a plurality of different driving functions for automated driving with a different degree of automation for a motor vehicle, for example for an automobile. The driving system preferably comprises:
- a driving function for highly automated driving,
- a driving function for partially automated driving with automated longitudinal and lateral guidance, and
- a driving function for assisted driving with only automated longitudinal guidance (for example adaptive cruise control) and/or a driving function for assisted driving with only automated lateral guidance (for example an automatic lane-keeping function).

At least the driving function with the highest degree of automation (for example the driving function for highly automated driving) is not constantly available (that is to say is not available in every driving situation). The availability of the driving functions with a lower degree of automation can also be restricted. Since the demands imposed on the availability conditions for the availability generally increase with an increasing degree of automation, the one or more driving functions with a lower degree of automation are preferably available anyway if the driving function with a higher degree of automation is available. For example, a driving function for partially automated driving is generally available if the driving function for highly automated driving is available.

The availability of a driving function which is not constantly available typically depends on the driving situation and can depend, for example, on the compliance with one or more of the following availability conditions:
- availability conditions relating to the vehicle environment: for example the presence of lane markings, the presence of a vehicle driving in front, information relating to a traffic sign, the approval of a highway section ahead for highly automated driving, and
- availability conditions relating to the vehicle state: for example a driver's own vehicle speed less than or less than or equal to a particular threshold speed and/or a driver's own vehicle speed greater than or greater than or equal to a particular other threshold speed.

The driving system is preferably configured to capture driving situation information relating to the current driving situation. This driving situation information is used to decide on the compliance with the one or more availability conditions for the respective driving function. The driving situation information preferably comprises one or more of the following types of driving situation information:
- information captured by way of an environment sensor system,
- information determined by way of a sensor system relating to the vehicle state, for example the driver's own vehicle speed;
- information received by radio, for example the approval of a freeway section ahead for highly automated driving which is received by radio;
- information captured by way of a navigation system, for example information relating to the current driving position or the route ahead.

The driving system has a user interface for interacting with the driver. The user interface comprises an input component which is common to the plurality of driving functions and is intended to signal, for the driver, the driver's general desire for automated driving to the driving system by virtue of an operating action being carried out via the input component. This is preferably a common operating element which can be actuated by the driver, for example a button (for example arranged on the steering wheel). The fundamental desire to activate the automation can be expressed to the driving system by the driver by means of the operating action via the input component (that is to say the desire to activate any of the different driving functions). The operating action is the same for activating the different driving functions and is not used to select a particular driving function from the plurality of driving functions by the driver.

If an operating button is used as the common operating element, it may be a mechanically operating pushbutton or a sensor button (for example a virtual button on a touchscreen).

The common input component may also be (instead of an actuatable operating element) a voice input device which is used by the driver to signal the desire for automated driving to the system. The operating action is then a voice input by the driver which generally signals the desire for automated driving without the voice input being directed to a specific driving function from the plurality of driving functions. The voice input device receives a voice signal, in particular a voice command, from the driver and evaluates it by means of voice recognition. For example, the driver gives the voice command "Drive in an automated manner" or "Please drive in an automated manner". This is interpreted by the voice input device such that the driver desires automated driving.

Instead of using an operating element or a voice input, an input by means of a gesture could be provided in order to signal the desire for automated driving to the system.

The driving system is configured to determine the operating action carried out via the input component, for example actuation of the common operating element for automated driving by the driver.

After determining the operating action (for example the actuation of the common operating element), that available driving function from the plurality of driving functions which then has the highest possible degree of automation is determined immediately afterward or else only later, for example.

For this purpose, at least the availability of the function with the highest degree of automation is checked by the driving system (for example after the operating action (for example actuation of the common operating element) or even before this). The availability preferably relates to the current driving situation. Alternatively, the availability can also relate to a driving situation ahead which will be reached within a few seconds, for example. The system can then already offer the driving function to the driver in advance, for example.

If it is determined that even the driving function with the highest degree of automation is available, this corresponds to the available driving function with the highest possible degree of automation determined by the system.

If the driving function with the highest possible degree of automation is not available, a check is carried out, for example, in order to determine whether a second driving function with a next lower degree of automation (for example partially automated driving) is available. If this second driving function is available, this corresponds to the driving function with the highest possible degree of automation determined by the system. If this second driving function is not available either, a check is carried out, for example, in order to determine whether a driving function for assisted driving is available (for example a driving function for assisted driving with only automated longitudinal guidance); if available, this driving function then corresponds to the driving function with the highest possible degree of automation. It may be the case that a driving function for assisted driving (for example ACC) is always available.

If the driving function which has the highest possible degree of automation among the available driving functions has been determined, it can be activated.

The driving system according to the invention provides the advantage that the driver is unburdened when selecting and activating the driving function available in the driving situation since the system itself offers the driving function with the highest possible degree of automation among the one or more driving functions available in the driving situation. The concept also makes it possible to reduce the number of operating elements. This is cost-effective and easier to operate.

Provision may be made for the determined available driving function with the highest possible degree of automation (for example highly automated driving in the current driving situation) to be directly activated by the system without a further operating action by the driver.

Alternatively, provision may be made for the determined available driving function with the highest possible degree of automation to first be offered to the driver for activation by the system, in which case the driver can then activate the activation by means of an operating action (for example by releasing the steering wheel and/or the accelerator pedal, by actuating another operating button, by means of particular hand gestures or by speaking a command).

After the operating action for automated driving has been carried out (for example the common operating element has been actuated), the vehicle itself suggests, for example, which assistance function is available in the current driving situation and offers this function to the driver for activation. The offer may involve a visual indication on a screen or a head-up display, an acoustic indication (from a simple signal tone to a voice output) or a haptic indication (for example in the steering wheel or in the driver's seat). The driver can accept an offer by selecting, for example, a visual offer using a cursor and an operating element. Since the respectively offered driving function is automation of longitudinal and/or lateral dynamics, it is advantageous to use a foot pedal and/or the steering wheel to accept the offer. A voice input is naturally also possible.

Instead of the driver having to actuate the correct operating element in order to activate a driving function in the respective driving situation, the driver receives an offer from the vehicle itself. The concept is easily and inexpensively scalable to technical equipment variants since only the offers change, but not the switches fitted.

The user interface preferably comprises an output component for offering a driving function for automated driving to the driver. The output component is, for example, a display in the vehicle cockpit, in particular a display in the combination instrument or a steering wheel display, or a head-up display. Alternatively or additionally, the offer can also be effected acoustically (for example a simple signal tone or a voice output) and/or haptically (for example via the steering wheel or the seat).

The user interface then preferably also has an acceptance component for accepting the offer of the driving function for automated driving by the driver. The acceptance component may be, for example, a further operating element (for example a further operating button) or the same operating element as the operating element common to the plurality of driving functions. An acceptance via an acceptance gesture or a voice command would also be conceivable. However, the acceptance component of the user interface preferably comprises at least one operating element for manual vehicle guidance, for example a steering wheel, an accelerator pedal or a brake pedal, wherein the driver's acceptance of the offer is determined if the operating element is released (for example release of the steering wheel with the hands or release of the accelerator pedal with the foot).

If the output component and the acceptance component are provided for the user interface, the driving system may be configured to offer the determined available driving function with the highest possible degree of automation to the driver via the output component (for example a text output on a screen with the content "Highly automated driving available. Please release the steering wheel and accelerator pedal for activation"). The system checks whether the driver accepts the offered driving function for automated driving via the acceptance component. If this is the case, the offered driving function for automated driving is activated by the system in response to the determination of the driver's acceptance of the offer.

Only an offer for at most one single driving function from the plurality of driving functions, namely for the identified driving function with the highest possible degree of automation, preferably exists at any desired time—if an offer is actually present. However, it would be possible instead to offer not only the driving function with the highest possible degree of automation but to additionally offer an available driving function with a lower degree of automation to the driver, but the offer for the available driving function with the highest possible degree of automation is prioritized over the offer for another available driving function with a lower degree of automation in a manner perceptible to the driver (for example is offered with a larger font size on the screen or is offered in a manner highlighted in another manner in comparison).

It is advantageous if the driving system is configured to communicate the necessary operating action for accepting the offered driving function to the driver via the output component. The driving function can also be implicitly offered as part of the communication relating to the operating action (for example "For highly automated driving, please release the steering wheel"). The offering of the driving function and the communication of the necessary operating actions are preferably carried out using the same output element of the output component (for example using the same screen); however, this is not compulsory.

The indication of the necessary operating action is advantageous, in particular, when the operating actions for the different driving functions are not identical. At least a plurality of the operating actions are preferably different. For example, different operating actions are each carried out using a different operating element of the user interface or different operating actions are carried out using the same operating element, but there is different interaction with the operating element (for example an operating element, for example an accelerator pedal, is pressed in contrast to the release of the operating element). A plurality of the operating actions may be identical.

If the offered driving function is a driving function with at least automated longitudinal guidance or with at least automated lateral guidance, the acceptance component preferably comprises at least one operating element for manual longitudinal guidance (for example an accelerator pedal) or at least one operating element for manual lateral guidance (for example a steering wheel). In this case, the driving system is configured to determine that the driver has released the operating element, in which case a driver's acceptance of the offer of the driving function is determined on the basis of the release of the operating element. The system may alternatively also be configured to determine the acceptance on the basis of a release of the operating element. In the case of a steering wheel, the term "release" can be understood as meaning either only the complete release with both hands or alternatively only the one-sided release with one hand (while the other hand still remains on the steering wheel).

For example, the driving function is a driving function with at least automated lateral guidance, wherein the acceptance component comprises the steering wheel of the vehicle in this case. A driver's acceptance of the offer of the driving function is detected on the basis of the determination that the driver has removed his hands from the steering wheel. If the driving function also has automated longitudinal guidance in addition to the automated lateral guidance, it may also be necessary to release the accelerator pedal in addition to releasing the steering wheel in order to accept the offer.

In response to the determination of the driver's acceptance of the offer, the offered driving function for automated driving is activated, that is to say automated driving is started.

In the example above, it was assumed that the driver removes both hands from the steering wheel in order to accept the offer. Depending on the implementation of the system, provision may alternatively or additionally be made for the driver to release only one side of the steering wheel in order to accept the offer of lateral guidance (that is to say only one hand releases the steering wheel, while the other hand continues to hold the steering wheel). If automated lateral guidance in the sense of assisted or partially automated driving is available, for example, during a journey on the freeway, the system could be configured, for example, in such a manner that, in order to accept the offer, it would already be sufficient to remove only one hand from the steering wheel (if the driver himself removed both hands from the steering wheel, the lateral guidance would preferably likewise be activated as a result). If the system can determine that the steering wheel is released with only one hand in order to accept the offer, provision may be made for a release of the steering wheel with both hands to also be understood as acceptance by the system. Alternatively, provision may be made for no acceptance of the offer to be possible if the steering wheel is released with both hands (in contrast to releasing the steering wheel with only one hand).

The state before activating the available driving function with the highest possible degree of automation determined by the system may be a state in which a driving function from the plurality of driving functions is not yet active.

However, it is also contemplated, after the operating action carried out via the common input component (for example after actuation of the common operating element), for a driving function with a lower degree of automation to first of all already be activated (in which case a driving function with a higher degree of automation is not yet available at the activation time). In the state with an active driving function with a lower degree of automation, it is then possible to subsequently determine that a driving function with a higher degree of automation is available, in particular the driving function with the highest degree of automation (for example highly automated driving in the case of partially automated driving which is already active).

If it is subsequently determined that the driving function with the higher degree of automation is available, the driving system could be configured to directly activate the driving function with the higher degree of automation without this requiring a further operating action by the driver.

However, it is advantageous if, instead of when the availability of the driving function with the higher degree of automation is determined, the driving function with the higher degree of automation is first of all offered to the driver via the output component. The driver can then confirm the offered driving function with a higher degree of automation via the acceptance component, in particular by actuating an operating button. The driving system then changes from the driving function with the low degree of automation to the driving function with the higher degree of automation.

If the common input component is a common operating element, a light-emitting display is preferably integrated in the common operating element or is assigned to the common operating element (in particular by virtue of a spatial vicinity, for example arranged directly beside the operating element in the cockpit). The light-emitting display is, for example, the search illumination of the common operating element, in particular the search illumination of an operating button used as the common operating element. The driving system is configured to signal the availability of at least one of the driving functions, at least in particular the availability of the driving function with the highest degree of automation, to the driver via the light-emitting state of the light-emitting display. If, for example, the driving function for highly automated driving is available, the light-emitting display (in particular the common operating button) emits light in a defined light color (for example blue), for example. Otherwise, the light-emitting display does not emit light at all, for example, or emits light in a different light color (for example in a neutral light color, for example white) in the case of lower ambient light.

Different light-emitting states may be provided for the light-emitting display (for example different light colors) in order to represent the availability of a respective driving function for different driving functions. For example, the light-emitting display emits blue light if highly automated driving is available, whereas the light-emitting display emits green light if only partially automated driving is available (and highly automated driving is not available).

In addition, functional illumination, which is arranged beside the operating element for example, may be provided for the common operating element. If the common operating element is actuated, the functional illumination changes over to a defined first light-emitting state (for example to the color blue) in order to signal to the driver that the driving function assigned to this light-emitting state (for example highly automated driving in the case of the color blue) is activated or will be activated, if appropriate following prior confirmation of the offered driving function by the driver. For example, the driving function with the highest degree of automation is assigned to the first light-emitting state. If this assigned driving function is not activated after actuating the common operating element because it is not available, the functional illumination preferably switches to a second light-emitting state (for example green) after actuation.

If the driving function with the highest degree of automation is available, the search illumination emits light in the same color (for example blue) in which the functional illumination emits light, for example, if the operating element has been actuated and the driving function with the highest degree of automation is available.

If the driver no longer wants automation, he actuates the common operating element. In response to this, automatic driving is preferably prevented. If one of the driving functions for automated driving was already active, for example, upon renewed actuation, this driving function is deactivated and the vehicle is changed to a manual driving mode. If none of the driving functions for automated driving was active upon renewed actuation, a driving function is no longer automatically activated or offered to the driver before activation.

A second aspect of the invention relates to a method for activating a driving function for automated driving. A driving system comprises a plurality of different driving functions for automated driving with a different degree of automation. The method has the following steps of:

determining a driver's operating action of an input component which is common to the plurality of driving functions and is intended to signal the driver's desire for automated driving (in particular determining actuation of a common operating element by the driver);

after the operating action has been determined, determining that available driving function from the plurality of driving functions which has the highest possible degree of automation; and activating the determined available driving function with the highest possible degree of automation.

The statements made above with respect to the driving system according to the invention in accordance with the first aspect of the invention also apply in a corresponding manner to the method according to the invention in accordance with the second aspect of the invention.

Advantageous exemplary embodiments of the method according to the invention which are not explicitly described at this point and in the patent claims correspond to the advantageous exemplary embodiments of the driving system according to the invention which were described above or are described in the patent claims.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
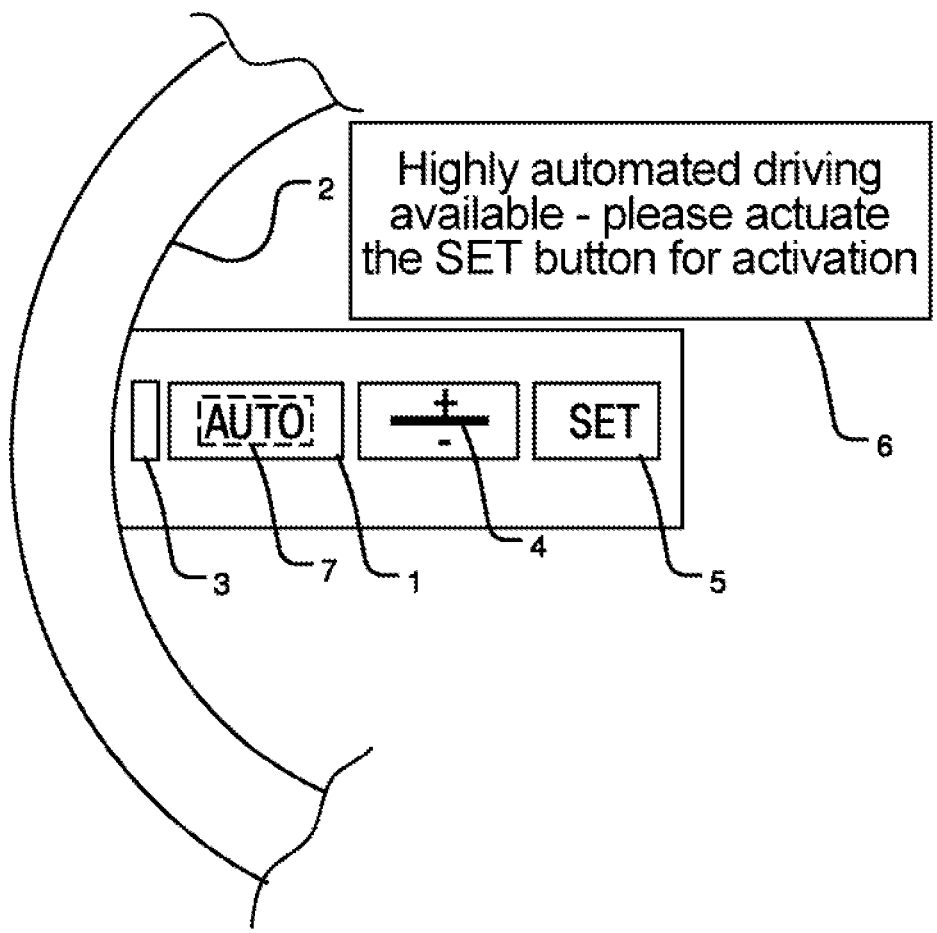
FIG. 1 shows an exemplary user interface.

FIG. 1 schematically illustrates components of an exemplary embodiment of a user interface for an exemplary driving system. The driving system comprises (with decreasing degree of automation) a driving function for highly automated driving (HAF) with automated longitudinal and lateral guidance (in particular for use on a freeway), a driving function (TAF) for partially automated driving with automated longitudinal and lateral guidance and a driving function (AF) for assisted driving with only automated longitudinal guidance. A driving function for assisted driving with only automated lateral guidance could optionally also be provided.

The user interface comprises an operating element 1 ("AUTO") for signaling the desire for automated driving to the driving system. The operating element 1 ("AUTO") is implemented as an operating button, for example, and is preferably integrated in a steering wheel 2, in which case a section of the steering wheel rim of the steering wheel 2 is illustrated in FIG. 1. A light-emitting display 3 which is used as functional illumination is arranged beside the common operating element 1 ("AUTO"), which light-emitting display fundamentally emits light in a first light color (for example green) after actuation of the operating element 1 ("AUTO"), but emits light in a second light color (for example blue) if the highly automated driving is available after actuation of the operating element 1 ("AUTO").

Search illumination 7 is preferably integrated in the operating element 1 and can illuminate the inscription on the operating element (here "AUTO") in a particular light color, for example. The availability of the driving function HAF for highly automated driving can be communicated to the driver via the light-emitting state of the search illumination 7. If the driving function HAF is available, the search illumination emits light in the same color (here blue) in which the functional illumination 3 emits light, for example, if the operating element 1 has been actuated and the driving function HAF is available. Otherwise, the search illumination 7 does not emit light at all, for example, or emits light in a neutral light color (for example white) in the case of lower ambient light.

Furthermore, a rocker 4 which can be moved in two opposite directions is provided and is used, for example, to change a predefined driving speed during assisted or partially automated driving.

The driver can accept an offered driving function for automated driving via an operating element 5 ("SET"), for example a button.

In addition, a display 6 is provided, for example in the instrument combination or in the head-up display, and can be used to offer a driving function for automated driving to the driver.

Figure 2:
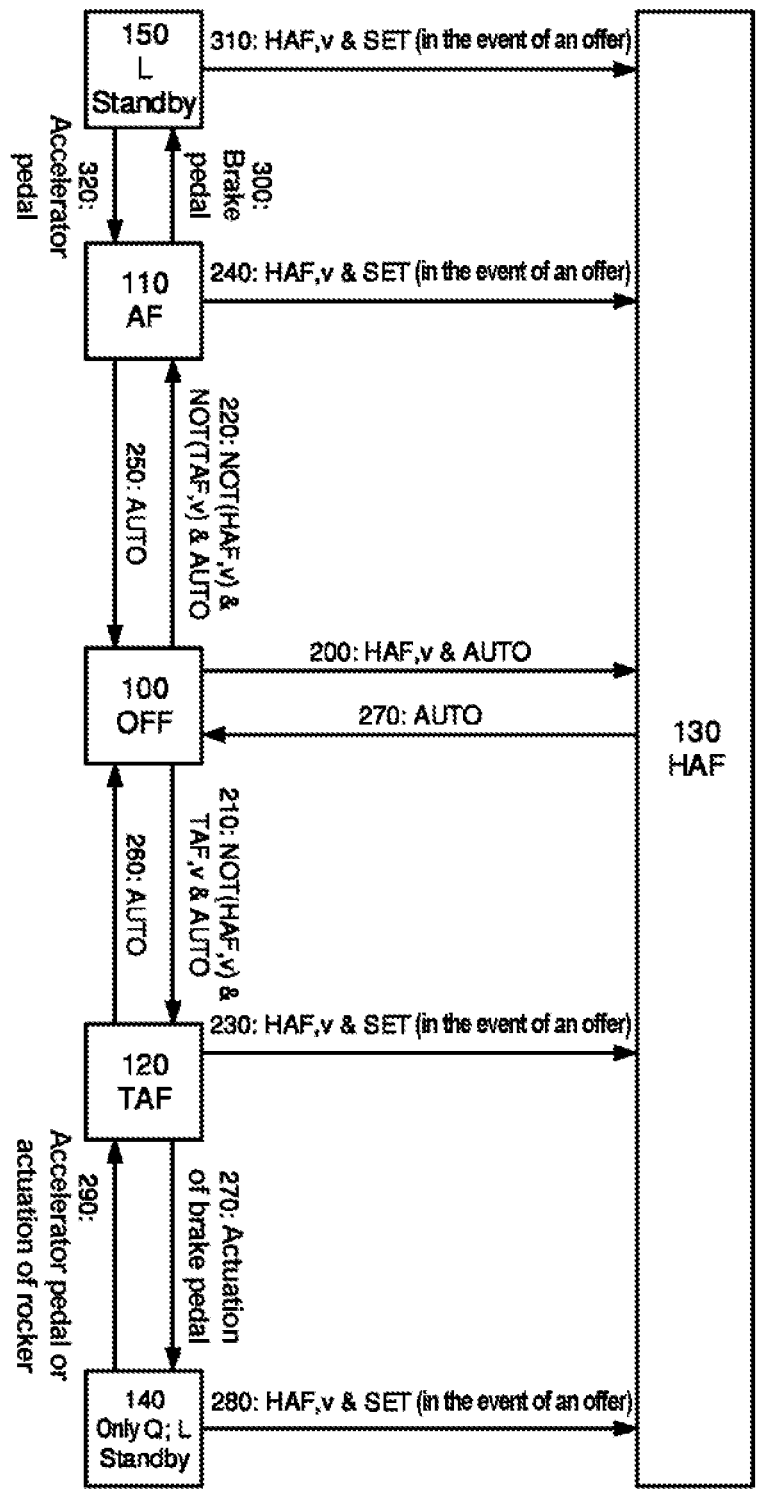
FIG. 2 shows a first exemplary embodiment for activating driving functions for automated driving.

FIG. 2 illustrates an exemplary method of operation for activating driving functions for automated driving on the basis of the user interface above.

The driving system may be in one state of a plurality of states, namely, for example, in the state 100 without automated driving, in the state 110 with an activated driving function AF for assisted driving with only automated longitudinal guidance, in a state 120 with an activated driving function TAF for partially automated driving with automated longitudinal and lateral guidance and in a state 130 with an activated driving function HAF for highly automated driving with automated longitudinal and lateral guidance.

Starting from the state 100 without automated driving, if the driving function HAF is available ("HAF,v"), the driving function HAF is activated in response to actuation of the operating element 1 ("AUTO") and the state 130 is therefore assumed (see state transition 200). If the driving function HAF is not available ("NOT(HAF,v)") (for example because the current driving speed is too high), but the driving function TAF is available ("TAF,v"), the driving function TAF for partially automated driving is activated in response to actuation of the common operating element 1 ("AUTO") and the state 120 is therefore assumed (see state transition 210). If neither the driving function HAF ("NOT(HAF,v)") nor the driving function TAF ("NOT(TAF,v)") is available (for example because the vehicle is currently not being guided manually in a sufficiently central manner in the lane), the driving function AF for assisted driving is activated in response to actuation of the operating element 1 ("AUTO") and the state 110 is therefore assumed (see state transition 220).

That available driving function from the driving functions AF, TAF and HAF which has the highest possible degree of automation at this time among the available functions is therefore determined and this available driving function is then activated by the system. In this exemplary embodiment, it is assumed that, starting from the state 100, the available driving function with the currently highest possible degree of automation is automatically activated by the system (in the case of a previously activated operating element 1) without the driver having to carry out a further operating action.

If the driving system has reached the state 120 after actuation of the operating element 1 ("AUTO") if the driving function HAF is not available, and if the driving function TAF for partially automated driving is active, the situation may subsequently arise in which it is determined that the driving function HAF is now available ("HAF,v"). In this case, the driver is advised, via the display 6, that the driving function HAF is available and the activation of the driving function is offered to the driver (see FIG. 1 "Highly automated driving available"). The operating action which can be used by the driver to activate the driving function HAF is communicated to the driver on the display 6. For example, the offered driving function HAF can be accepted by the driver by actuating the operating element 5 ("SET"), with the result that the driving function HAF is activated in response to the actuation of the operating element 5 ("SET"). Starting from the state 120 with an active driving function TAF, the driving function HAF is offered if the driving function HAF is available ("HAF,v") and the driving function HAF is activated if the offer is accepted by actuating the operating element 5 ("SET") (see state transition 230).

If, in contrast, the driving system has reached the state 110, if the driving function HAF is not available and if the driving function TAF is not available, and if the driving function AF for assisted driving is active, the situation may subsequently arise in which it is determined that the driving function HAF is now available ("HAF,v"). Starting from the state 110 with an active driving function AF, the driving function HAF is then offered in a similar manner if the driving function HAF is available ("HAF,v") and the driving function HAF is activated if the offer is accepted by actuating the operating element 5 ("SET") (see state transition 240).

Provision is also made of a further state 140 to which the driving system changes from the state 120 if the driver actuates the brake pedal in the state 120 during partially automated driving (see state transition 270). In the state 140, the automated lateral guidance (Q) of the driving function TAF is continued, whereas the automated longitudinal guidance of the driving function is in the standby mode, that is to say is currently not active, with the result that the driver manually performs the longitudinal guidance. If the driving function HAF becomes available in the state 140 ("HAF,v"), this driving function HAF is offered to the driver and is activated if the offer is accepted by actuating the operating element 5 ("SET") (see state transition 280).

If the driver actuates the accelerator pedal in the state 140, the driver is requested, via the display 6, to release the accelerator pedal. After the accelerator pedal has been released, the system changes to the state 120 again. In addition, the driver can change back to the state 120 by actuating the rocker 4. In this case, depending on the manner in which the rocker is actuated, an earlier set speed is used as the set speed or the current vehicle speed is used as the set speed.

Provision may also be made of a further state 150 to which the driving system changes from the state 110 if the driver actuates the brake pedal in the state 110 (see state transition 300). In the state 150, the longitudinal guidance is in the standby mode. If the driving function HAF becomes available ("HAF,v") in the state 150, this driving function HAF is offered to the driver and is activated if the offer is accepted by actuating the operating element 5 ("SET") (see state transition 310).

If the driver no longer wants any further automation in the case of active automation in the state 110, 120 or 130, the driver can actuate the operating element 1, with the result that the driving system assumes the state 100 without automation again (see state transitions 250, 260, 270).

Figure 3:
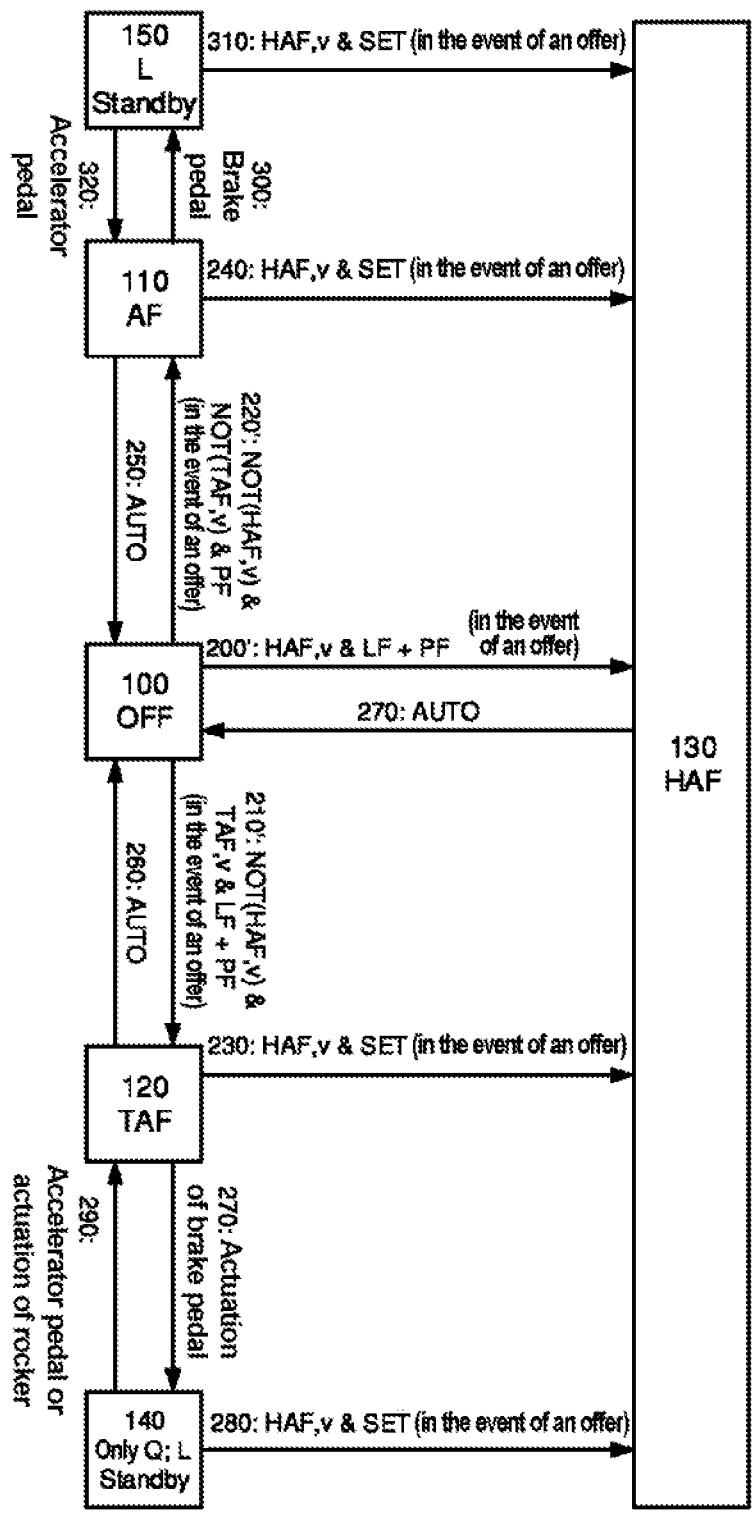
FIG. 3 shows a second exemplary embodiment for activating driving functions for automated driving.

A further exemplary embodiment is discussed below in connection with FIG. 3. In this case, in contrast to the exemplary embodiment in FIG. 2, a driving function for automated driving (that is to say highly automated driving, partially automated driving or assisted driving depending on availability) is first offered to the driver after actuation of the operating element 1 ("AUTO") starting from the state 100, in which case the driver must accept the offer by means of an operating action. The offered driving function is then activated in response to the acceptance.

Starting from the state 100 without automated driving, the driving function HAF is offered to the driver via the display 6, with a statement of the necessary operating action for acceptance (for example with the following advice: "Highly automated driving available—please release steering wheel and accelerator pedal for activation"), in response to actuation of the operating element 1 ("AUTO") if the driving function HAF is available ("HAF,v"). The offer of the driving function HAF can also be optically highlighted in the display 6 by means of color information (for example blue) assigned to the driving function HAF. The system checks whether the driver carries out the operating action (here: release of the steering wheel ("LF" in FIG. 3) and release of the accelerator pedal ("PF" in FIG. 3)) for acceptance. If the necessary operating action has been carried out by the driver for the purpose of accepting the offered driving function, the driving function HAF is activated and the state 130 is assumed (see state transition 200').

If the driving function HAF is not available ("NOT(HAF, v)"), but the driving function TAF is available ("TAF,v"), the driving function TAF for partially automated driving is offered to the driver, with a statement of the necessary operating action for acceptance (for example with the following advice: "Partially automated driving available— please release steering wheel and accelerator pedal for activation"), in response to actuation of the common operating element 1 ("AUTO"). If the necessary operating action has been carried out by the driver for the purpose of accepting the offered driving function, the driving function TAF is activated and the state 120 is assumed (see state transition 210').

If neither the driving function HAF ("NOT(HAF,v)") nor the driving function TAF ("NOT(TAF,v)") is available, the driving function AF for assisted driving is offered to the driver, with a statement of the necessary operating action for acceptance (for example with the following advice: "Assisted driving available—please release accelerator pedal for activation"), in response to actuation of the operating element 1 ("AUTO"). If the necessary operating action has been carried out by the driver for the purpose of accepting the offered driving function, the driving function AF is activated and the state 110 is assumed (see state transition 220').

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A driving system for providing a plurality of driving functions for automated driving of a motor vehicle, wherein the plurality of driving functions have different degrees of automation, the driving system comprising:
   a user interface comprising an input component, wherein the input component enables a driver of the motor vehicle to indicate a desire to use any of the plurality of driving functions to the driving system by way of an operating action; and
   a controller that, after determining the operating action of the driver via the input component, identifies and activates a driving function from the plurality of driving functions,
   wherein the controller identifies the driving function by:
      determining whether a first driving function of the plurality of driving functions is available to be used in a current driving situation, wherein the first driving function has a first degree of automation that is a highest degree of automation of the degrees of automation of the plurality of driving functions,
      in response to determining that the first driving function is available to be used in the current driving situation, identifying the first driving function as the driving function, or
      in response to determining that the first driving function is not available to be used in the current driving situation:
         determining whether a second driving function of the plurality of driving functions is available to be used in the current driving situation, wherein the second driving function has a second degree of automation that is lower than the first degree of automation, and
         in response to determining that the second driving function is available to be used in the current driving situation, identifying the second driving function as the driving function.

2. The driving system according to claim 1, wherein
   the input component is an actuatable operating element, and
   the operating action is actuation of the operating element.

3. The driving system according to claim 1, wherein the user interface further comprises:
   an output component configured to offer to provide the driving function to the driver, and
   an acceptance component configured to enable the driver to accept an offer to provide the driving function, wherein:
   after determining the operating action of the driver via the input component, the controller:
      offers to provide the driving function to the driver via the output component,
      determines an acceptance of the driver of the offer of the driving function via the acceptance component, and
      activates the driving function in response to determining the acceptance of the driver of the offer.

4. The driving system according to claim 3, wherein after determining the operating action of the driver via the input component, the controller:
   assigns, to the driving function, the operating action to be performed via the acceptance component to accept the offer,
   communicates the operating action to accept the offer to the driver via the output component,
   determines whether the driver carries out the operating action to accept the offer, and
   activates the driving function in response to determining that the driver has carried out the operating action.

5. The driving system according to claim 4, wherein
   the driving function provides at least one of automated longitudinal guidance or automated lateral guidance,
   the acceptance component comprises at least one of a first operating element configured to provide manual longitudinal guidance or a second operating element configured to provide manual lateral guidance, and after determining the operating action of the driver via the input component, the controller:
  determines that the driver has freed or released the first operating element or the second operating element, and
  determines that the driver has accepted the offer to provide the driving function based on a determination that the driver has freed or released the first operating element or the second operating element.

6. The driving system according to claim 5, wherein
the driving function provides automated lateral guidance,
the acceptance component comprises a steering wheel as the first operating element, and
after determining the operating action of the driver via the input component, the controller:
  determines that the driver has removed both hands from the steering wheel or determine that the driver has removed one hand from the steering wheel while the other hand remains on the steering wheel, and
  determines that the driver has accepted the offer to provide the driving function based on a determination that the driver has removed both hands from the steering wheel or that the driver has removed one hand from the steering wheel while the other hand remains on the steering wheel.

7. The driving system according to claim 5, wherein
the driving function provides automated longitudinal guidance,
the acceptance component comprises an accelerator pedal as the second operating element, and
after determining the operating action of the driver via the input component, the controller:
  determines that the driver has released the accelerator pedal, and
  determines that the driver has accepted the offer to provide the driving function based on a determination that the driver has released the accelerator pedal.

8. The driving system according to claim 3,
wherein after determining the operating action of the driver via the input component, the controller:
  determines, when the second driving function is active, that the first driving function is available to be used in the current driving situation,
  in response to a determination that the second driving function is active, offers to provide the first driving function to the driver via the output component,
  determines an acceptance of the driver of an offer to provide the first driving function via the acceptance component, and
in response to determining the acceptance of the driver of the offer to provide the first driving function, activates the first driving function.

9. The driving system according to claim 8, wherein
the first degree of automation is for highly automated driving as defined by level 3 of standard SAE J3016.

10. The driving system according to claim 8, wherein
the acceptance of the driver of the offer to provide the first driving function is carried out via actuation of a button.

11. The driving system according to claim 1, wherein after determining the operating action of the driver via the input component, the controller
  automatically activates the driving function without a further operating action by the driver.

12. The driving system according to claim 1, wherein the plurality of driving functions comprise:
  a driving function configured for highly automated driving as defined by level 3 of standard SAE J3016,
  a driving function configured for partially automated driving, and
  a driving function configured for assisted driving.

13. The driving system according to claim 1, wherein
the input component is an actuatable operating element,
a first light-emitting display is assigned to the operating element, and
after determining the operating action of the driver via the input component, the controller provides an indication of an availability of the driving function to be used in the current driving situation to the driver via a light-emitting state of the first light-emitting display.

14. The driving system according to claim 13, wherein
the first light-emitting display is integrated in the operating element.

15. The driving system according to claim 13, wherein
a second light-emitting display is assigned to the operating element, and
after determining the operating action of the driver via the input component, the controller changes a state of the second light-emitting display to a defined first light-emitting state upon actuation of the operating element in order to provide an indication of an activation of the driving function to the driver in response to determining that the driving function is available to be used in the current driving situation.

16. The driving system according to claim 15, wherein
the second light-emitting element is a light-emitting display arranged beside the operating element.

17. The driving system according to claim 1, wherein
the input component is an actuatable operating element, and
after determining the operating action of the driver via the input component, the controller prevents automated driving of the motor vehicle in response to determining that the operating element is actuated again.

18. A method for activating a driving function for automated driving in a motor vehicle having a driving system for providing a plurality of driving functions for automated driving, wherein the plurality of driving functions have different degrees of automation, the method comprising the steps of:
  determining an operating action of a driver of the motor vehicle via an input component, wherein the input component enables the driver to indicate a desire to use any of the plurality of driving functions; and
  after the operating action has been determined, identifying and activating a driving function from the plurality of driving functions;
wherein identifying the driving function comprises:
  determining whether a first driving function of the plurality of driving functions is available to be used in a current driving situation, wherein the first driving function has a first degree of automation that is a highest degree of automation of the degrees of automation of the plurality of driving functions,
  in response to determining that the first driving function is available to be used in the current driving situation, identifying the first driving function as the driving function, or
  in response to determining that the first driving function is not available to be used in the current driving situation:
    determining whether a second driving function of the plurality of driving functions is available to be used in the current driving situation, wherein the second driving function has a second degree of automation that is lower than the first degree of automation, and in response to determining that the second driving function is available to be used in the current driving situation, identifying the second driving function as the available driving function having the highest degree of automation.

\* \* \* \* \*